(12) United States Patent
Ober

(10) Patent No.: US 9,186,814 B2
(45) Date of Patent: Nov. 17, 2015

(54) ATMOSPHERIC STORAGE MECHANICAL WEIGHT BATCH BLENDING PLANT

(71) Applicant: Robert W. Ober, San Antonio, TX (US)

(72) Inventor: Robert W. Ober, San Antonio, TX (US)

(*) Notice: Subject to any disclaimer, the term of this patent is extended or adjusted under 35 U.S.C. 154(b) by 410 days.

(21) Appl. No.: 13/758,394

(22) Filed: Feb. 4, 2013

(65) Prior Publication Data

US 2014/0216302 A1 Aug. 7, 2014

(51) Int. Cl.

| B28C 7/04 | (2006.01) |
|---|---|
| B28C 7/06 | (2006.01) |
| B28C 9/02 | (2006.01) |
| C04B 28/02 | (2006.01) |
| C09K 8/46 | (2006.01) |

(52) U.S. Cl.
CPC ............ *B28C 7/0422* (2013.01); *B28C 7/0418* (2013.01); *B28C 7/062* (2013.01); *B28C 9/02* (2013.01); *C04B 28/02* (2013.01); *C09K 8/46* (2013.01)

(58) Field of Classification Search
CPC .................................................. B28C 7/0422
USPC .................................. 366/18, 20, 141, 64–66
See application file for complete search history.

(56) References Cited

U.S. PATENT DOCUMENTS

| 750,949 | A | * | 2/1904 | Darrow et al. ................ 366/20 |
|---|---|---|---|---|
| 808,599 | A | * | 12/1905 | Crichfield .................... 366/18 |
| 3,661,365 | A | | 5/1972 | Cloud, Jr. |
| 4,525,071 | A | | 6/1985 | Horowitz et al. |
| 4,896,968 | A | | 1/1990 | Baillie |
| 5,203,628 | A | | 4/1993 | Hamm |
| 7,464,757 | B2 | | 12/2008 | Pessin et al. |
| 2008/0273415 | A1 | * | 11/2008 | Thornton et al. ................ 366/3 |

FOREIGN PATENT DOCUMENTS

| WO | 2008/025049 A2 | 3/2008 |
|---|---|---|
| WO | 2008/025049 A3 | 3/2008 |

OTHER PUBLICATIONS

William E. Jackson, "Casing and Cementing," Rotary Drilling Series, 3rd Ed., Unit II, Lesson 4, Petroleum Extension Service Continuing & Extended Education, The University of Texas, Austin, Texas, 2001.
"Notification Concerning Transmittal of International Preliminary Report on Patentability," Patent Cooperation Treaty, Aug. 13, 2015.

* cited by examiner

*Primary Examiner* — David Sorkin
(74) *Attorney, Agent, or Firm* — Gunn, Lee & Cave, P.C.

(57) ABSTRACT

An atmospheric storage mechanical weigh batch blend plant is shown with atmospheric storage for providing a dry, pre-blend, oilfield cement ready for mixing at the wellhead for slurry injection into a well head upon adding the proper amount of water and other fluids. The batch blend plant has three separate weighing mechanisms for (a) larger or bulk quantity materials, (b) intermediate quantities of materials, and (c) small amounts of additives to be included to the mixture. The entire weigh batch blend plant can be disassembled and moved. A special pressurized air bearing is used in the blender.

10 Claims, 19 Drawing Sheets

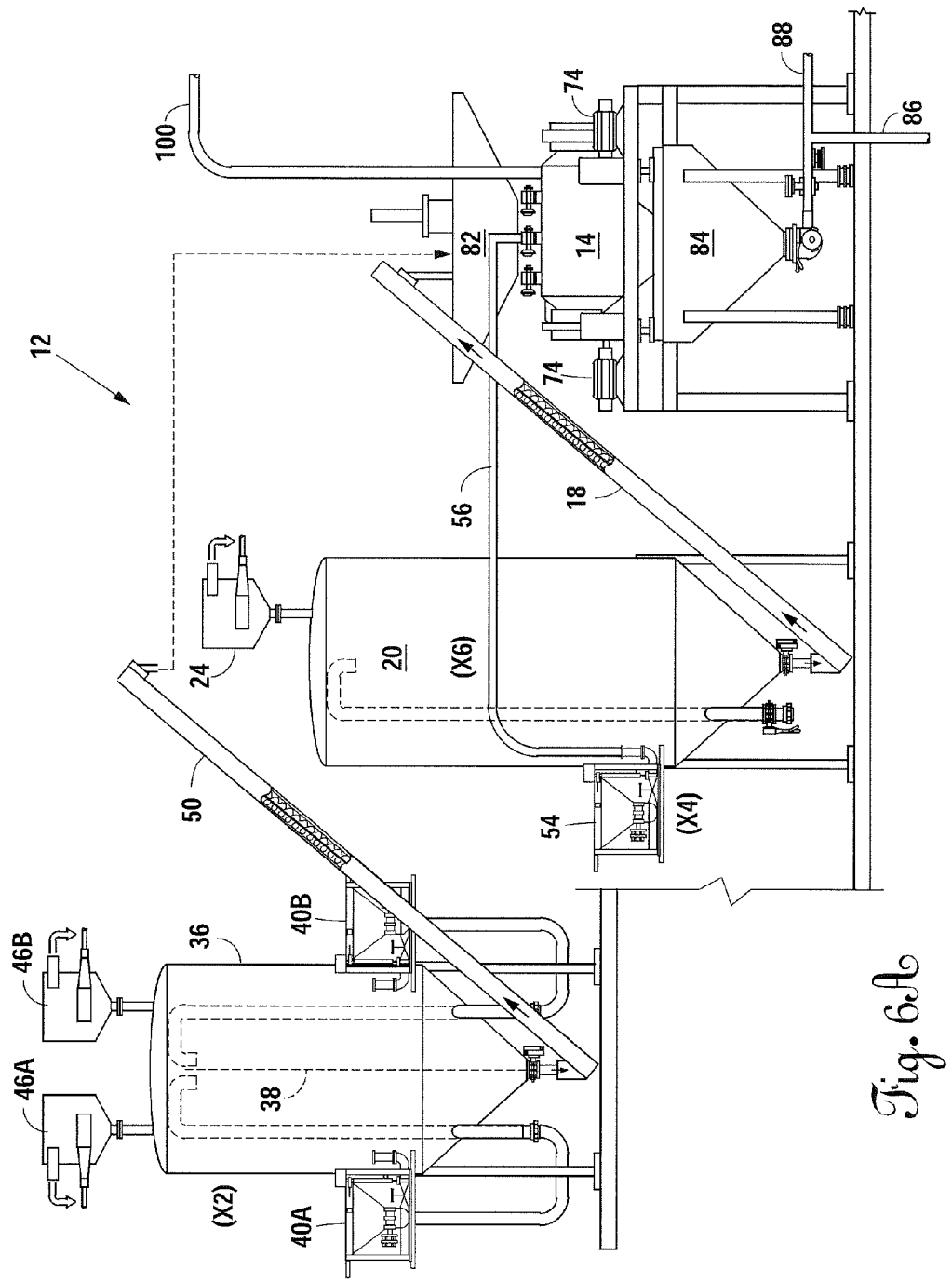

| LEGEND | | | |
|---|---|---|---|
| ⌀ | PRESSURE SWITCH | ▭ | SHEAR BEAM LOAD CELL |
| ▷▭ | T-INJECTOR | ∿∿ | MATERIAL SCREW |
| ——— | MATERIAL FLOW | |✍| | BUTTERFLY VALVE |
| — — — | AIR FLOW | ⋈ | BALL VALVE |
| ▬▬▬ | WATER FLOW | ⋈ | GATE VALVE |
| ------- | ELECTRICAL FLOW | ⋈ | SOLENOID VALVE |
| ◁—○ | SPRAY WAND | ⫲ | PNEUMATIC ACTUATOR |
| ∿∿ | HOSE | ⌶ | PRESSURE REGULATOR |
| ⌶ | LEVEL INDICATOR | (M) | MOTOR HORSEPOWER |
| ⇌ | LOAD CELLS | (M) | REVERSING MOTOR HORSEPOWER |
| ▫ | PROXIMITY SWITCH | (M) | MOTOR W/BRAKE COIL |
| ○⊢ | AIR CANNON | (SS) | SAFETY SWITCH STOP |
| ⊏⊦ | MOISTURE PROBE | (ZS) | ZERO SPEED SWITCH |
| ▣ | ELECTRIC VIBRATOR | (CS) | COUNT SWITCH |
| ⌸ | PNEUMATIC VIBRATOR | (HC) | HYDRAULIC CYLINDER |
| ⧧ | SLIDE GATE | (PD) | PRESSURE DEVICE |
| ⤼ | RELIEF VALVE | (TD) | TEMPERATURE DEVICE |
| ⌸ | PINCH VALVE | (FD) | FLOW DEVICE |
| \ | AERATION PAD | (AS) | AIR SUPPLY |
| ⌸ | RELAY | (MS) | MIST SEPARATOR |
| XX | EQUIPMENT NUMBER | (AD) | AMBIENT DRYER |
| ⊛ | CIRCULATION FAN | (FS) | FILTER SEPARATOR |
| ▦▦▦ | DRAG CHAIN CONVEYOR | (AC) | AIR CYLINDER |

(M36) PLATFORM HOIST (M16) BLENDER MOTOR #1

(M17) BLENDER MOTOR #2

*Fig. 8c*

ATMOSPHERIC STORAGE MECHANICAL WEIGHT BATCH BLENDING PLANT

FIELD OF THE INVENTION

The present invention relates to a dry cement batching and blending plant, and more particularly, to a portable dry cement batching and blending plant that will accurately measure and completely blend the ingredients of dry pre-made cement mixtures, which are then mixed with water at the well site for the oil & gas drilling and fracturing industry.

BACKGROUND OF THE INVENTION

A practice of using cement in the oil industry began around 1903 in California in an attempt to stop water from flowing into the oil well, and oil and gas from entering the waterways (aquifers). In those early years, cement was hand mixed and run into a dump baler to the spot needing to be plugged. Pumping cement, which would be mixed with water, down a well was soon also recognized as beneficial to encase the well and achieve a safer and more efficient operation of the drilling process. A forerunner of the modern two (2)-plug method was first used in 1910. The two (2) plugs minimize mud contact with the cement. Although both mechanical and chemical improvements have been made in a cementing process, the original plug concept is still valid today.

Erle Halliburton cemented a well in Oklahoma's Hewitt Field in 1920. The dry blending of oilfield cements is attained by many means, but the most prevalent remains the pneumatic transfer of the individual constituent parts of cements and additives, which are moved from pressure vessel to pressure vessel. This remains very similar to what was developed in the 1920's. These moves are often layered or "pancaked" to affect somewhat of a blend when then transferring to the next in a series of tanks. This type of mixing is referred to as "moves". Moves result in a very unscientific and haphazard blending methodology, as the differing specific gravities and molecular makeup of the varies constituent materials including various cements, bulk powder additives and granulated minerals and chemicals, are not easily comingled. Cement blends produced in this manner are highly dependent on the experience and attention of the blend plant operator. Numerous problems have been encountered with variations in such un-uniform blending which results in the ununiformed blends needing to be "spiked" or modification of the cement blends at the well site prior to mixing with water to get a properly performing and more complete mixture. A poor cement blend mixture can cause many problems including poor set strength, inadequate cement bond, blowouts, poor formation fracing or lack of mud displacement, which in the least presents environmental hazards, and losses in productivity, and in the worst cases can result in severe injury and loss of life due to blowouts and resulting explosions and fire.

Because of the inconsistencies in the mix cement product, many oilfield operators have gone to "pod" or "batch mixing". In the pod or batch mixing, all of the ingredients for the cement are put inside of a mixer and stirred together. This mix of blended cement is taken either in a slurry form or a powder form to the wellhead. At the wellhead, if it's in the powder form, water is added as the slurry is injected into the well. The using of pod or batch plants solved to some degree the cementing problems at shallow depths.

However, over the years, many different types of cements have been developed. The American Petroleum Institute recognizes Class A through Class J of different types of cements. When deciding upon cement job not only does a type of cement have to be selected, but so does the various additives. Many different additives have developed over the years. Oil wells have gotten deeper and deeper, and in recent years drilling is both vertical and horizontal, so the cementing occurs at higher pressures and higher temperatures, and the correct cement blend or mixture becomes more and more critical. Each well service company provides its own particular blend or "recipe" for their cement jobs, especially cement used at depths of 10,000 feet or more and are expected by well owners to provide a high level of quality assurance of high-performing well encasement with the pre-blended cements. The invention allows the utmost in quality assurance to the well service contractor, the well owner, landowner, and the community as a whole, while protecting the well rig workers and the environment.

For the blends used at high pressures and temperatures, it becomes important to completely mix (1) large volumes by weight items in the pre-blended dry cements, (2) intermediate volumes by weight of some items in the pre-blended dry cements, and (3) small volumes by weight of additives in the pre-blended cements. All of these must be perfectly pre-blended together to give the ideal cement blend at the well site prior to mixing with water or other fluids. If the ideal dry cement pre-blend is not reached and the cements and additives are not properly applied, blowouts can occur such as the BP Petroleum blowout that occurred in the Gulf of Mexico in 2010. Since the catastrophic BP blowout, more and more attention has been given to the accuracy of the pre-blend of cement being used, especially in deep wells, and in fracturing of wells, and also on offshore drilling.

In an attempt to solve the problem of inadequate pre-blending of oilfield cement, many of the larger companies have developed their own system or techniques. For example, Schlumberger Technology Corporation in U.S. Pat. No. 7,464,757, shows a batch mixing facility to deliver homogenized mixing slurry to a well pumping system, but this mixing can only affect the water/fluid-cement ratios and homogenize the mixture with the fluid, and does nothing to affect the imbalance of poorly pre-blended dry cements delivered to the well mixer out of specification of the recipes and safety requirements.

One of the problems with the prior systems is when water is added to the cement mixture, the resulting slurry can only be as good as the dry pre-blend, which at present is most unscientific and haphazard resulting in varying quality and unknown performance of the well encasement.

SUMMARY OF THE INVENTION

It is an object of the present invention to provide an apparatus to give a measured, dry, and completely pre-blended oilfield cement and additives recipe that can be substantiated in a controlled and measurable fashion as to provide expected performance when mixed with fluids at the well site.

It is another object of the present invention to provide a method for weigh-batching and exacting measurement of all constituent materials making up the oilfield cement according to a predetermined formula—by a computerized and controlled method.

It is yet another object of the present invention to provide a portable pre-blend dry oilfield cement plant that can accurately blend a dry cement to a measurable quantity by weight according to a predetermined formula.

It is yet another object of the present invention to provide a portable blending plant that can blend a dry cement mixture that has (1) bulk ingredients, (2) intermediate ingredients and, (3) small amount ingredients, each being measured by weight, into a complete pre-blend as to allow for multiple small parts to be thoroughly interspersed throughout the mass of the pre-blend.

It is yet another object of the present invention to provide a blender that can blend large quantities of dry cement mixtures to provide a completely blended homogeneous dry pre-blended bulk ready-to-mix specialized cement for mixing with fluids at the wellhead.

In the blending plant a collection of bulk storage tanks are arranged around a weigh batcher. Mechanical screw augers connect from each of the bulk storage tanks to the weight batcher to provide an automated and recordable dosing of each constituent bulk powder to be blended. The weigh batcher measures by weight a predetermined quantity from selected bulk storage tanks. The measured quantities are then fed to a mechanical blender of a batch-type providing for a consistent and recordable quantity and batch number allowing for traceability and subsequent quality assurance practices so badly required in oilfield well encasement practices to date.

Intermediate quantities of ingredients for the cement blend are also weighed and fed into the blender. The intermediate quantities are normally delivered in bulk sacks or bags, rather than in truckloads as for the bulk storage tanks.

Also, small amounts of ingredients to be added to a cement mixture are also weighed and delivered to the blender through a drag tube conveyor—nothing is left to hand-add measurements or human error in the invention. The blending plant then automatically and thoroughly mechanically blends under only atmospheric conditions all of the dry ingredient-types (large, intermediate and small in quantities) into a dry homogeneous pre-blend. As soon as the blending is complete, the blender dumps the batch into appropriate weighed and automatically inventoried containers; and starts the blending process begins again in a cycle basis to automatically pre-blend a prescribed total pre-blend quantity of several tons for shipment by bulk transport truck or specialized oilfield bottle truck chassis to the well site.

Because the dry cement blend is very abrasive it can damage the bearings on any blender shaft used in a horizontal shaft equipped blender. Also, because any lubricant, such as grease, coming into contact with the cement blend can damage the cement blend, a special bearing was designed that uses pressurized air to (a) keep the cement mixture out of the bearing and (b) provide an air cushion on which the bearing will turn.

BRIEF DESCRIPTION OF THE DRAWINGS

FIGS. 6A and 6B are illustrated flow diagram of the weigh batch blend plant shown in FIGS. 1 and 2.

FIGS. 8*a* through 8*i* illustrate electrical controls for the atmospheric storage mechanical weigh batch blend plant of FIG. 8.

DESCRIPTION OF THE PREFERRED EMBODIMENT

Figure 1:
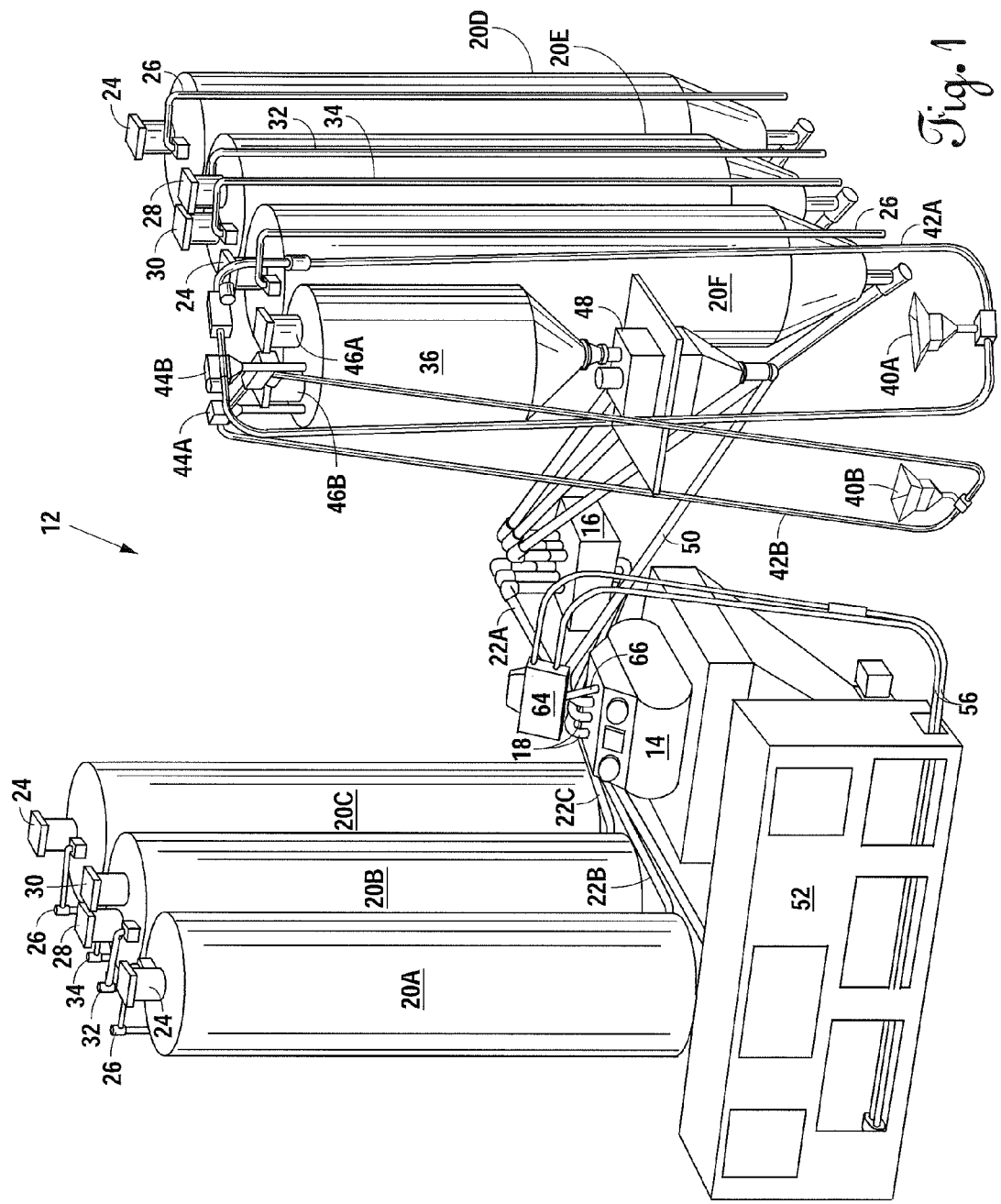
FIG. 1 is an illustrated perspective view of an atmospheric mechanical weigh batch blend plant.
Figure 2:
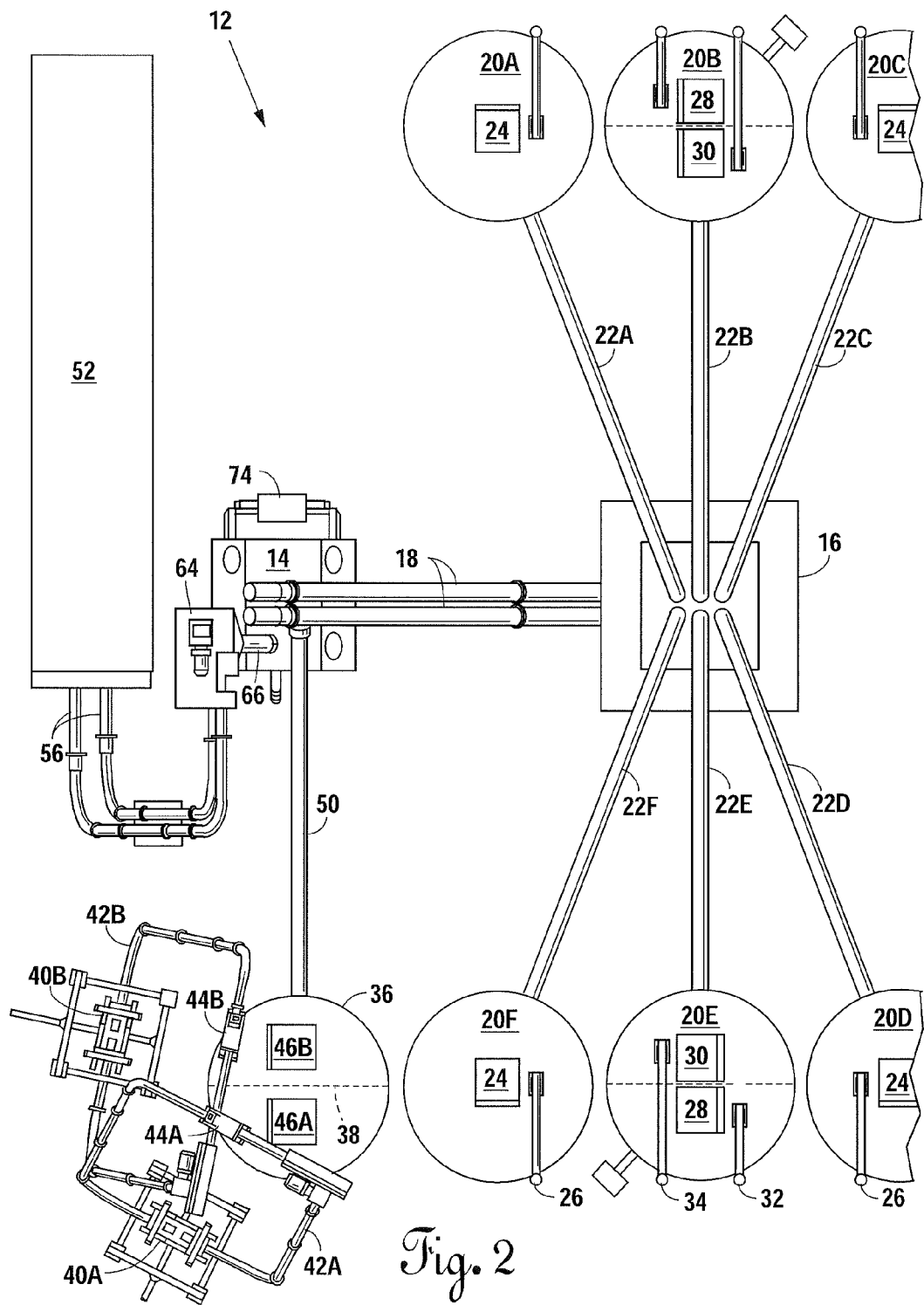
FIG. 2 is a top view of FIG. 1.

Referring now to FIGS. 1 and 2 in combination, an atmospheric storage mechanical weigh batch blend plant, representing by reference numeral 12, is shown. All of the ingredients of the cement recipe are mechanically forced together inside of the blender 14.

1. Bulk Materials

The larger constituent quantities of materials that are needed in a dry pre-blended cement, which are referred to as bulk materials, are stored in atmospheric bulk storage tanks 20A-20F. Bulk materials are received from bulk weigh batcher 16 via dual screw transport augers 18. Mechanical screw augers 22A-22F feed preselected bulk materials from either bulk storage tanks 20A-20F, respectively, into the bulk weigh batcher 16. Only preselected amounts of each bulk material from bulk storage tanks 20A-20F is fed into the bulk weigh batcher 16 as is determined by weight. Thereafter, the weighed amount of each bulk material from bulk storage tanks 20A-20F is fed via dual screw auger 18 into the blender 14.

Each of the bulk storage tanks 20A, 20C, 20D and 20F contain a single bulk material and have dust collectors 24 on the top thereof. When the bulk storage tanks 20A, 20C, 20D and 20F are being filled via vortex elbows 26 and air inside of the bulk storage tank 20 is being displaced, dust collectors 24 prevent dust from being discharged to the atmosphere.

Referring to bulk storage tanks 20B and 20E, these tanks are split down the middle by dividing wall (not shown) so they can store two different bulk materials. Therefore, two dust collectors 28 and 30 are required as well as two vortex elbows 32 and 34 for split bulk storage tanks 20B and 20E.

The use of the weigh batcher 16 with the mechanical screw augers 22 where a large amount of the bulk material contained in bulk storage tank 20 may be used, the large amount of material can be accurately weighed and fed through dual screw augers 18 into the blender 14.

2. Intermediate Materials

In a typical blend of dry cement that is to be used in deep wells with high pressure and temperatures, there will probably be some intermediate materials by weight in the mix. By intermediate there will not be as much as the bulk materials, but will be more than small amounts. The intermediate materials normally come in bulk bags rather than by the truckloads. The intermediate materials are storage in intermediate storage tank 36 that has a divided wall 38 to divide the intermediate storage tank 36 into two separate halves for two different intermediate materials to be included in the dry mixed cement. Each side of the intermediate storage tank 36 has a bulk bag unloader 40A and 40B. The bulk bag unloaders 40A and 40B connect to drag tubes 42A and 42B, respectively, that delivers the intermediate material to the respective sides of the intermediate storage tank 36 via discharge valves 44A and 44B, respectively.

When the intermediate storage tank 36 is being filled up, dust collectors 46A and 46B insure that no dust is discharged to the atmosphere as air inside of the intermediate storage tank 36 is displaced.

If the particular recipe calls for some of the intermediate materials contained in intermediate storage tank 36, the intermediate materials are discharged to a weigh vessel 48 contained there below (see FIG. 1). The weigh vessel 48 measures by weight an accurate amount of the intermediate material called for from the intermediate storage tank 36. Once properly weighed, the intermediate materials are moved by mechanical screw auger 50 to the blender 14.

3. Adding Small Amounts to Mixture

As wells are getting deeper, temperatures increasing and pressures increasing, a number of additives are combined in the recipe in small amounts. The additives could perform many of the following functions:

1. Being an accelerator to shorten the setting time;
2. Be a retardant that lengthens the setting time;
3. Increase the density (weight) of the cement blend;
4. Decrease the density of the cement;
5. Change the compressive strength of the cement;
6. Change the flow properties of the cement;
7. Change the dehydration rate of the cement;
8. Extend the cement to decrease the cost of cementing;
9. Be an anti-foam additive to prevent foaming;
10. Include bridging material to plug lost circulation zones.

The above listing is just a typical listing of the functions of various additives that maybe included in the cement blend recipe. For the materials that are added in small amounts, also called "additives", the additives are added in the mini batch facility 52, which is shown in more detail in FIG. 4. The mini batch facility 52, has a series of weigh vessels 54A-54C in which small amounts of an additive can be accurately weighed and then fed into the drag tubes 28.

Sometimes it is necessary to add an additive by hand, either because it is such a small amount or a decision was made at the last minute to include another additive. In that case, a hand add-on station 58 is provided where the addition can be weighed as added by personnel operating the plant, by hand, on scale 60 and added through the hatch 62. The small additives are delivered via the drag tubes 56 to the blender 14. The drag tube 56 moves the small amounts (additives) through a discharge housing 64 where the additives drop through additive tube 66 into the blender 14 (see FIG. 3).

By use of these three separate weighing systems, (1) for the bulk materials, (2) intermediate materials, and (3) the small additives, a very accurately measured dry cement material is delivered to the blender 14.

Figure 3:
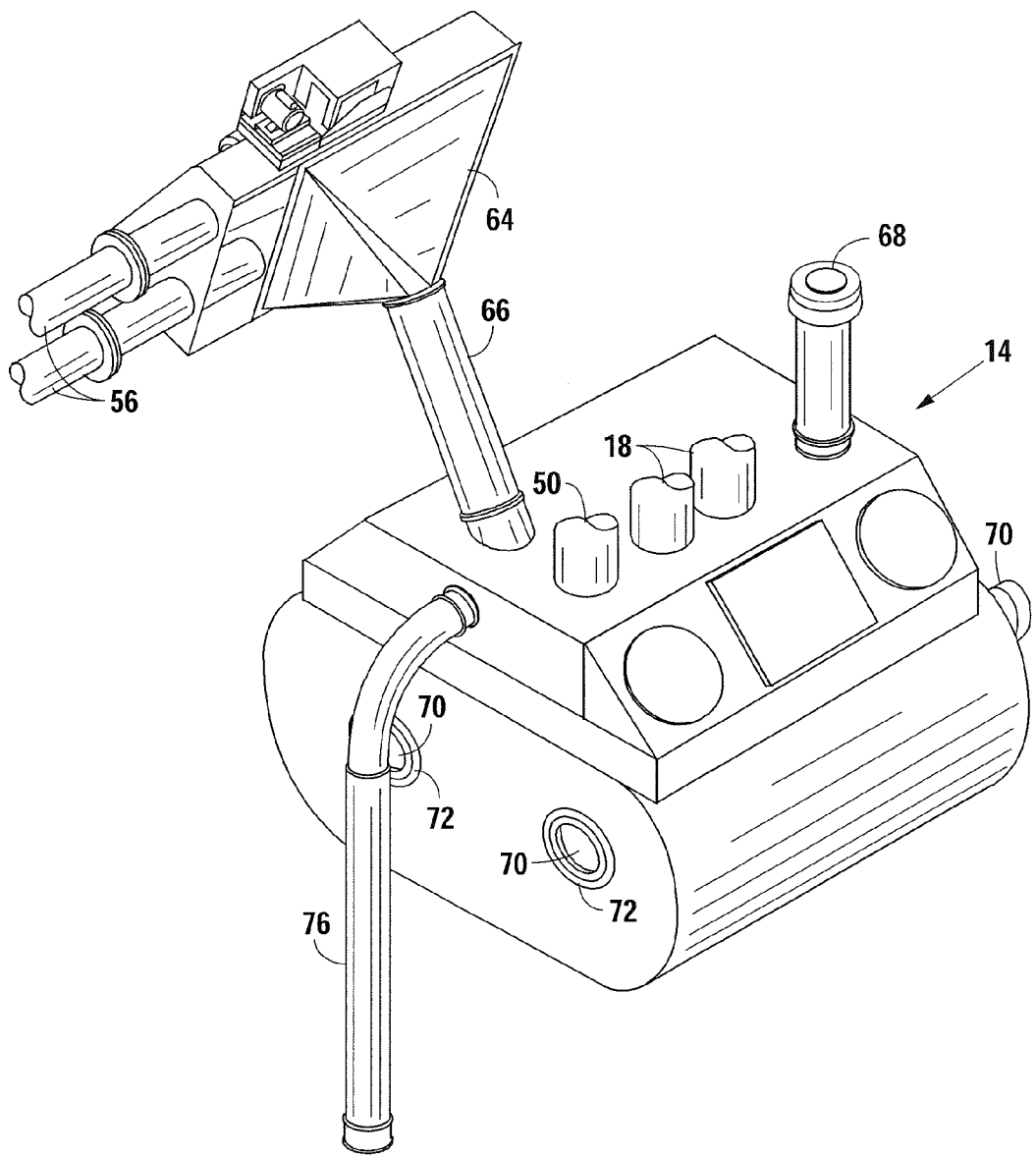
FIG. 3 is a perspective view of the blender used in FIGS. 1 and 2.

Referring now to FIG. 3, a large view of blender 14 is shown. The bulk materials are fed into the blender 14 through the dual screw augers 18. The intermediate materials are fed into the blender 14 through the mechanical screw augers 50. The small amounts additives are fed into the blender 14 via the drag tubes 56, discharge housing 64 and additives tube 66. A vent 68 that has dust collection therein, allows any air inside of the blender 14 to be displaced as the materials are added.

The blender 14 is a dual shaft blender with two shafts 70 extending horizontally through the blender. Specially designed bearings 72 are on each end, as will be discussed subsequently, of the shafts 70. The shafts 70 are turned by blender motor 74 (see FIG. 2). Extending from the top the blender 14 is ducting 76 that provides displaced atmosphere containing dust to be scavenged in a dust collection device called the blender scavenger—a pollution control device.

Figure 4:
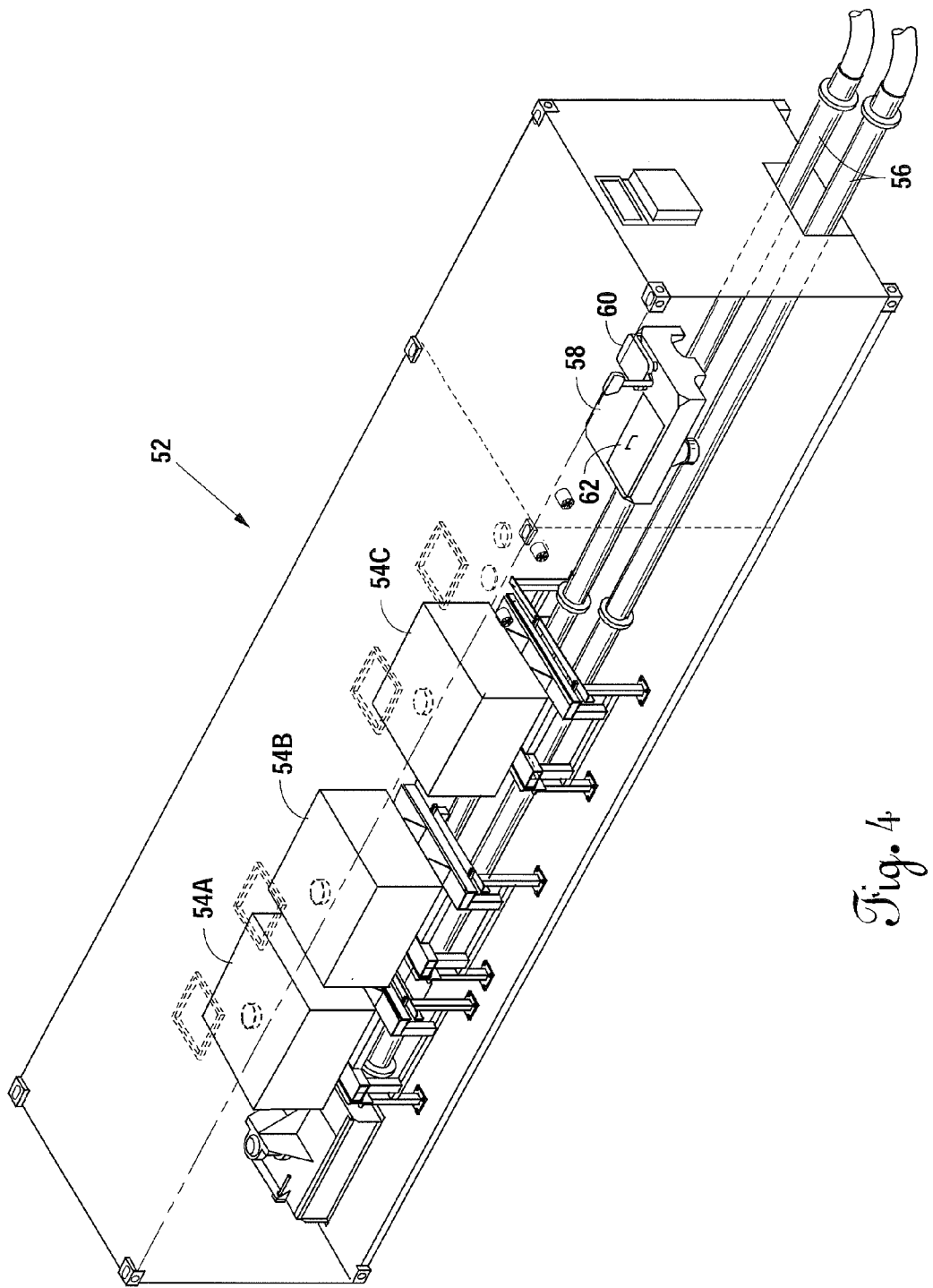
FIG. 4 is an illustrated perspective view of the mini batch portion of the weight batch blend plant shown in FIGS. 1 and 2.
Figure 5:
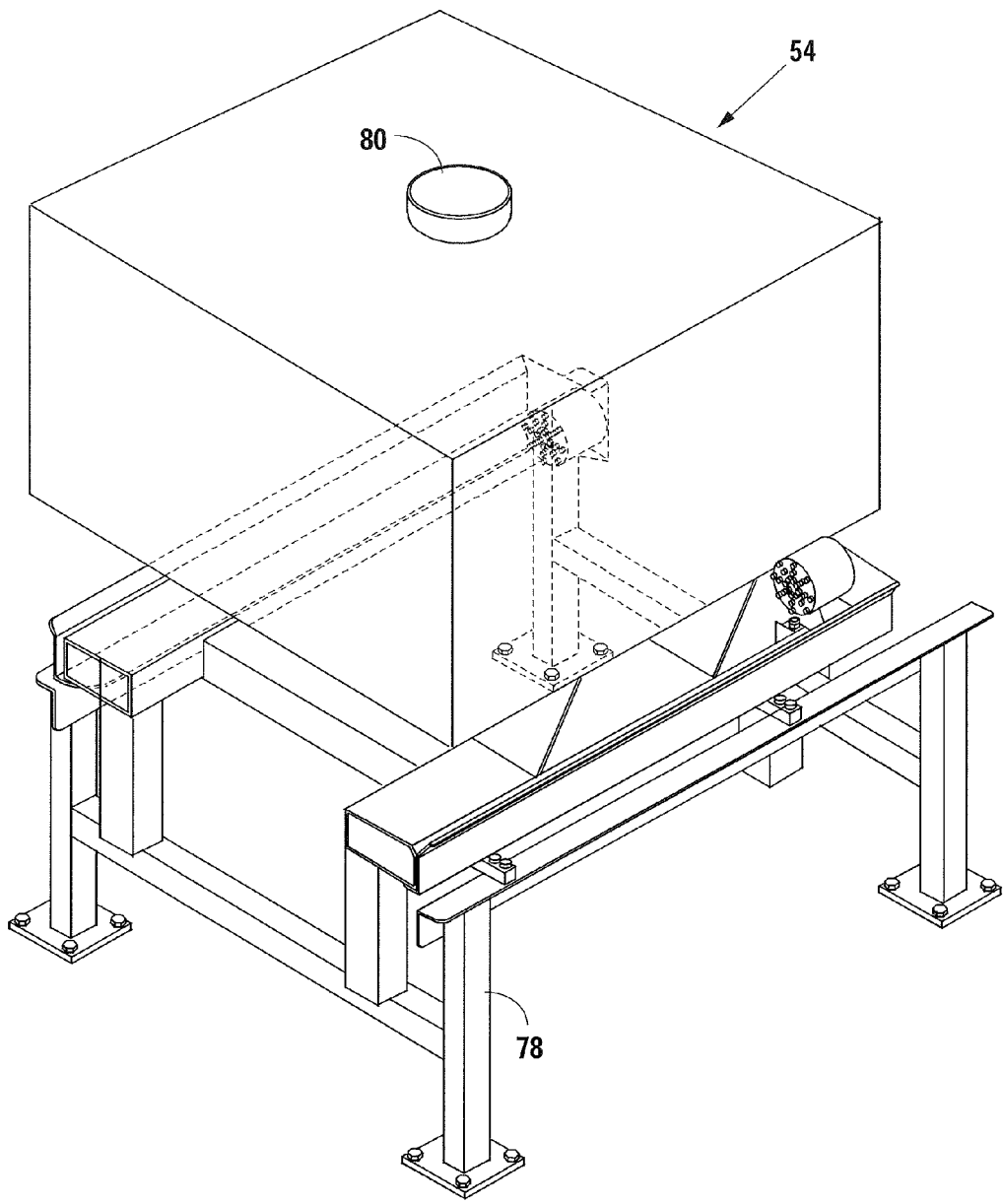
FIG. 5 is a perspective view of the weigh vessel for measuring intermediate quantities of cementing ingredients of the weight batch blend plant shown in FIGS. 1 and 2.

Referring now to the mini batch facility 52 is shown in FIG. 4, enlarged view of the weigh vessel 54 is shown in FIG. 5. The weigh vessel 54 is on a stand 78 with the drag tubes 56 (see FIGS. 1, 2, and 4) extending there below. The exact amount of a small additive that is desired is fed into the weigh vessel 54 through opening 80 and then discharged into the drag tubes 56. The weigh vessel 54 ensures that exactly the right amount of an additive is fed into blender 14 for the correct mixture or "recipe" for the dry pre-blended oilfield cement.

Figure 6B:
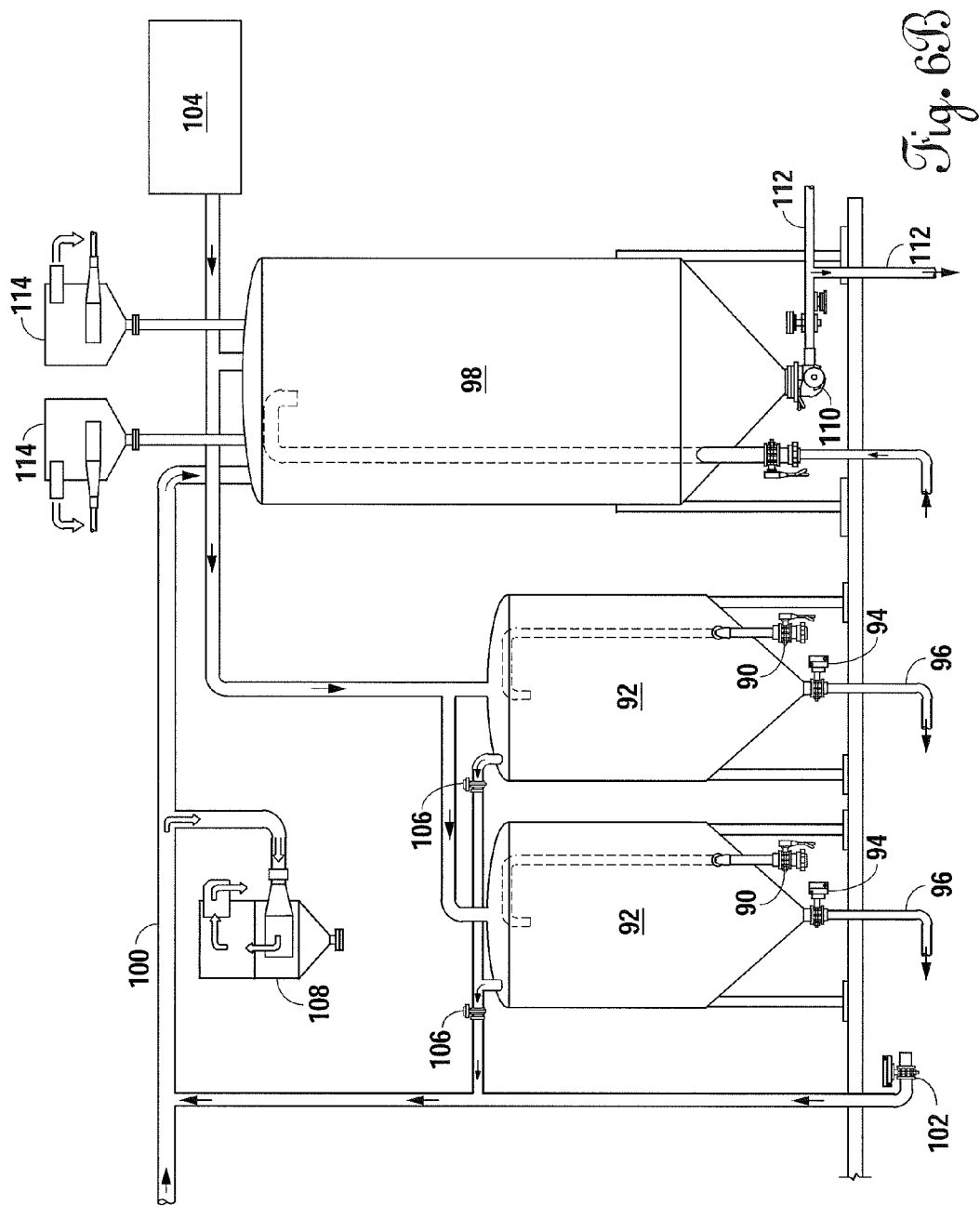

Referring to FIGS. 6A and 6B, a pictorial flow diagram of the various functions on the weigh batch blend plant 12 are shown. The same reference numbers as previously used will be used again, plus new reference numbers for new items. To the far left of FIG. 6A is the intermediate storage tank 36 with dust collectors 46A and 46B being located there above. The dividing wall 38 separates intermediate storage tank 36 into two halves. Bulk bags un-loaders 40A and 40B are used to load the intermediate storage tank 36 with the intermediate materials that are normally delivered in bulk bags. Mechanical screw 50 is used to deliver the intermediate materials to the hopper 82 of the blender 14.

Depending upon the number of intermediate materials that need to be introduced into the blend, a number of intermediate storage tanks can be increased as the desired. A typical number would be two (2) intermediate storage tanks 36 each having two halves, which would then accommodate a total of four different intermediate materials for the concrete blend—although this number may be reduced or added to accordingly as to accommodate blend recipes as required.

Weigh vessel 54 is used to put small amounts of additives into the concrete blend. Any number of weigh vessels 54 as is shown in mini batch facility 52 (see FIG. 4) can be added as needed. The additives are fed through drag line 56 into the blender 14. In a typical example there may be approximately four (4) weigh vessels 54.

The larger amounts of material that are delivered by truckloads will be stored in bulk storage tanks 20. Dust collectors 24 keep the discharge of dust from the bulk storage tanks 20 from getting into the atmosphere during loading and unloading. Materials delivered from bulk storage tanks 20 are weighed in a bulk weigh batcher 16 (see FIG. 2), then delivered via dual screw auger 18 to the hopper 82 of the blender 14.

Inside of the blender 14, the various ingredients of the dry cement recipe are blended together by dual shafts (not shown in FIGS. 6A and 6B) being turned inside of the blender 14 by motors 74. After the dry cement recipe is completely blended, together with all various additive and constituent materials, it is discharged by gravity from the blender 14 into ready mix hopper 84. When the product in the post-blend hopper 74 is completely blended (oilfield terminology to describe the mixture before water is added to form slurry is "pre-blend"), the pre-blend as contained in the pre-blend hopper 84 may be delivered to transport vehicle via transport conduit 86 or to pre-blend storage via storage conduit 88. If the pre-blend is to be stored, the storage conduit 88 connects to fill valves 90 of pre-blend storage tanks 92. From the pre-blend storage tanks 92 the pre-blend contained therein may be loaded onto transport vehicles at the desired time via control valves 94 and discharge ducts 96.

For almost all recipes of oil field cement blends for a particular formula, when switching to a different formula or recipe, there will be remnants of the prior mixture. To handle these remnants is a reclaimed storage tank 98. For example, if the blender 14 has remnants of a dry cement pre-blend therein when switching to a different blend, those remnants are pumped via reclaim line 100 to reclaim storage tank 98. If a transport vehicle has remnants remaining therein, they can also be pumped via reclaim valve 102 to the reclaim storage tank 98.

Likewise, if there are remnants left in pre-blend storage tanks 92 by pressurizing the pre-blend storage tanks 92 with compressor 104, any remnants remaining therein can be pumped via reclaim line 100 by opening pre-blend reclaim valves 106 via reclaim line 100 into reclaim storage tank 98. Reclaim dust collector 108 prevents any dust during the reclaim process from being discharged to atmosphere.

To get rid of reclaim materials contained in the reclaim storage tank 98, the compressor 104 pressurizes the reclaim storage tank 98 which then forces the reclaimed material out discharge control 110 for delivery through transport ducts 112 for disposal. If it becomes necessary for the reclaim storage tank 98 to vent to atmosphere, reclaim dust collectors 114 will ensure no dust is discharged to atmosphere.

Figure 7:
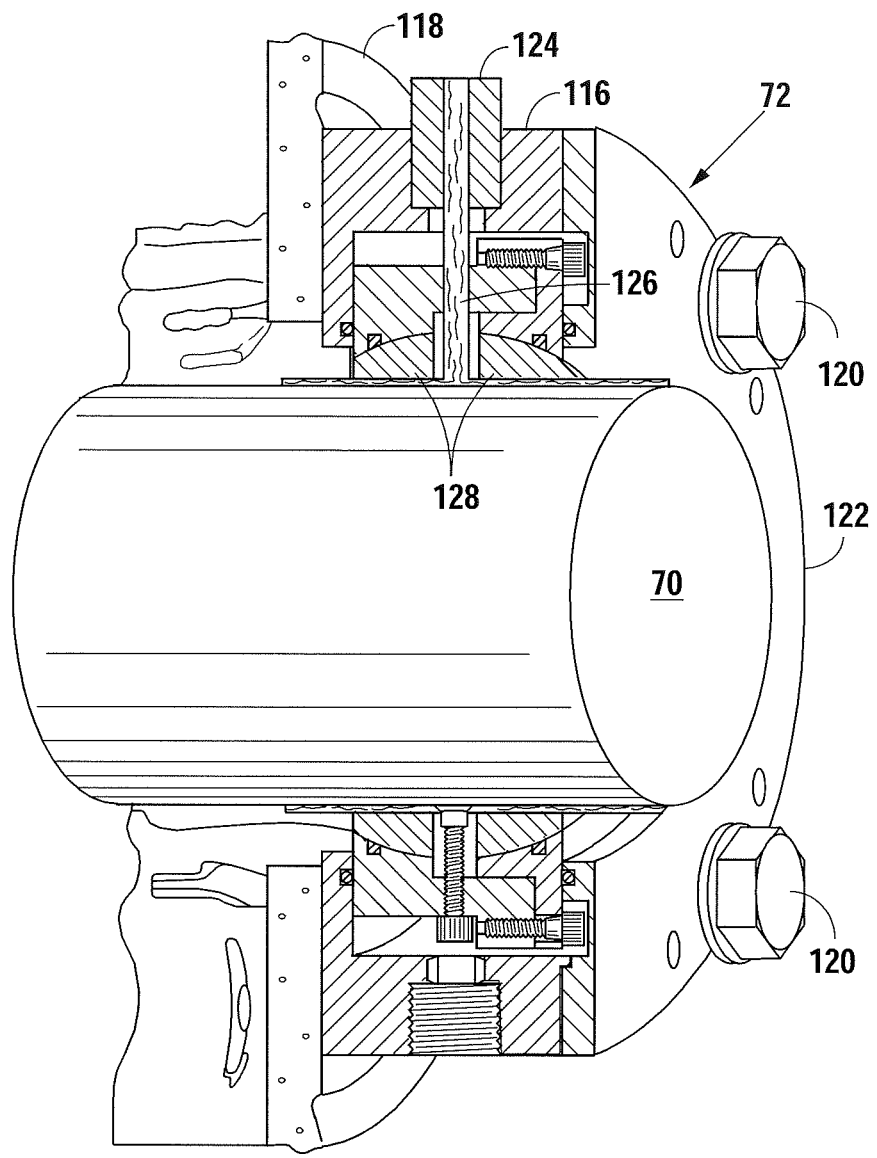
FIG. 7 is a cross-sectional view of a bearing used in the blender shown in FIG. 3.

Referring now to FIG. 7, the specially designed bearing 72 for the shafts 70 of the blender 14 is explained in further detail. The specially designed bearing consists of an annulus 116 being bolted to the blender housing 118 by bolts 120 pressing plate 122 against the annulus 116.

Through the annulus 116 is a pressurized air fitting that connects via air duct 126 to the shafts 70 to feed pressurized air from the compressor 104 (see FIG. 6B) via the air duct 126 to the surface between bearing 128 and shaft 70. This means there is a cushion of air between bearing 128 and shaft 70. Also the pressurized air keeps the material being mixed from getting into the area between bearing 128 and shaft 70. The shaft 70 is literally riding on a cushion of air.

Figure 8:
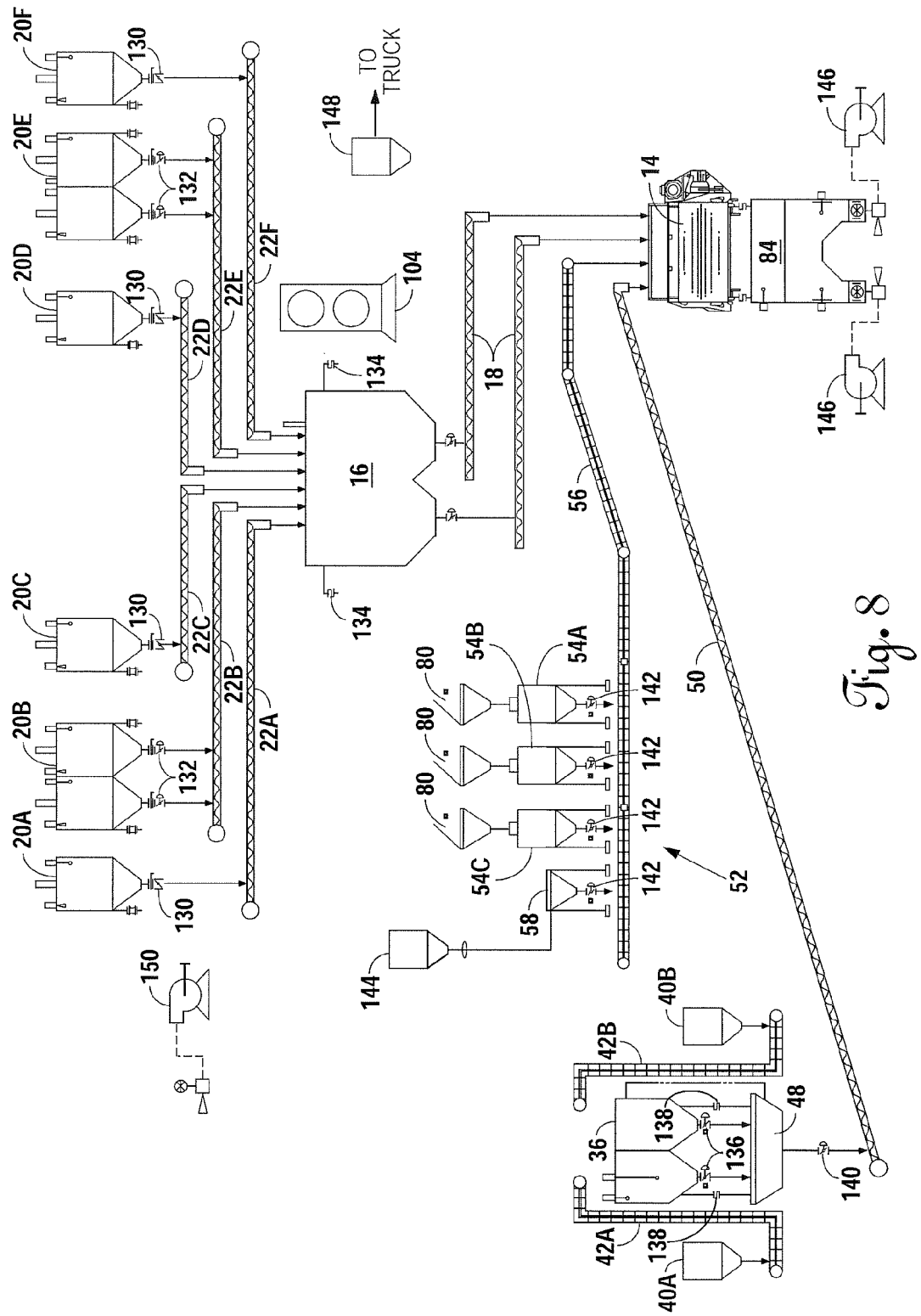
FIG. 8 is an illustrated flow diagram of the atmospheric storage mechanical weigh batch blend plant.

Referring to FIG. 8, a pictorial flow representation of the atmospheric storage mechanical weigh batch plant 12 as explained in FIGS. 1 and 2 is shown. Where possible, like numbers as used for FIGS. 1 and 2 will be used in FIG. 8. However, FIG. 8 will have additional reference numbers and explanations where necessary. The bulk storage tanks 20A-20F feed through conveyors 22A-22F, respectfully, into bulk weigh batcher 16. Delivery of bulk material from bulk storage tanks 20A, 20C, 20D and 20E is controlled by butterfly valves 130. Because bulk storage tanks 20B and 20E are split tanks pneumatic actuated butterfly valves 132 are used. The bulk weigh batcher 16 has load cells 134 to accurately measure the amount of bulk material that has been received. Once the proper amount of material has been received into the bulk weigh batcher 16, it is then delivered via dual augers 18 to the blender 14. The bulk weigh batcher 16 handles the large quantities of materials that would typically be used in a dry oilfield cement mixture. The quantities being handled by the bulk weigh batcher 16 are larger quantities (percentagewise) of the dry oilfield cement mixture.

At the intermediate storage tanks 36, bulk bags un-loaders 40A and 40B receive the bags of material which bags of material are dumped into an intermediate storage tank 36 via drag tubes 42A and 42B.

Below the intermediate storage tank 36 are pneumatic actuated butterfly valves 136 which controls the amount of intermediate material being delivered to the weigh vessel 48 as determined by load cells 138. When the proper amount of intermediate material has been received into the weigh vessel 48, pneumatically actuated butterfly valve 140 is opened and the intermediate material is delivered through mechanical screw auger 50 to the blender 14. The term "intermediate" refers to amounts by weight that is considerably less than the materials delivered by the bulk weigh batcher 16, but are much greater than the small additives typically mixed into a dry oilfield cement blend.

The mini batch facility 52 as is illustrated in FIG. 8, has a series of weigh vessels 54A-54C that can accurately measure small amounts of additives and deliver those small amounts of additives via pneumatically actuated butterfly valves 142 through the drag tube 56. The drag tube 56 will deliver the small amounts of additives to the blender 14.

Also the mini batch additive weighing portion of the overall facility 52 will have a hand weigh batcher 58 for the hand adding of small amounts of various additives. The hand amounts also feed through one of the pneumatically actuated butterfly valves 142 into drag tube 56. Each of the weigh vessels 54A-54C has an opening 80 through which the small amounts of additives can be stored. Even the hand weight batcher 58 has a vessel 144 in which to store small amounts of additives. The mini batch facility 52 adds the small portions by weight of materials that are necessary for the dry oilfield cement blend.

After the blender 14 has thoroughly forced the dry materials, into a blend, the dry oilfield cement blend is discharged into a post blend hopper holding pre-blended material 84 for either storage or delivery to the well site. Blowers 146 may be used to move the dry pre-blend oilfield cement in hopper 84 typically referred to as "pre-blend", to either the transport vehicle (not shown) or a storage vessel 148. The storage vessel 148 could be the same as the pre-blend storage tanks 92 as illustrated in FIG. 6B. The compressor 104 provides compressed air as needed particularly in operating various pneumatic valves.

Figure 8A:
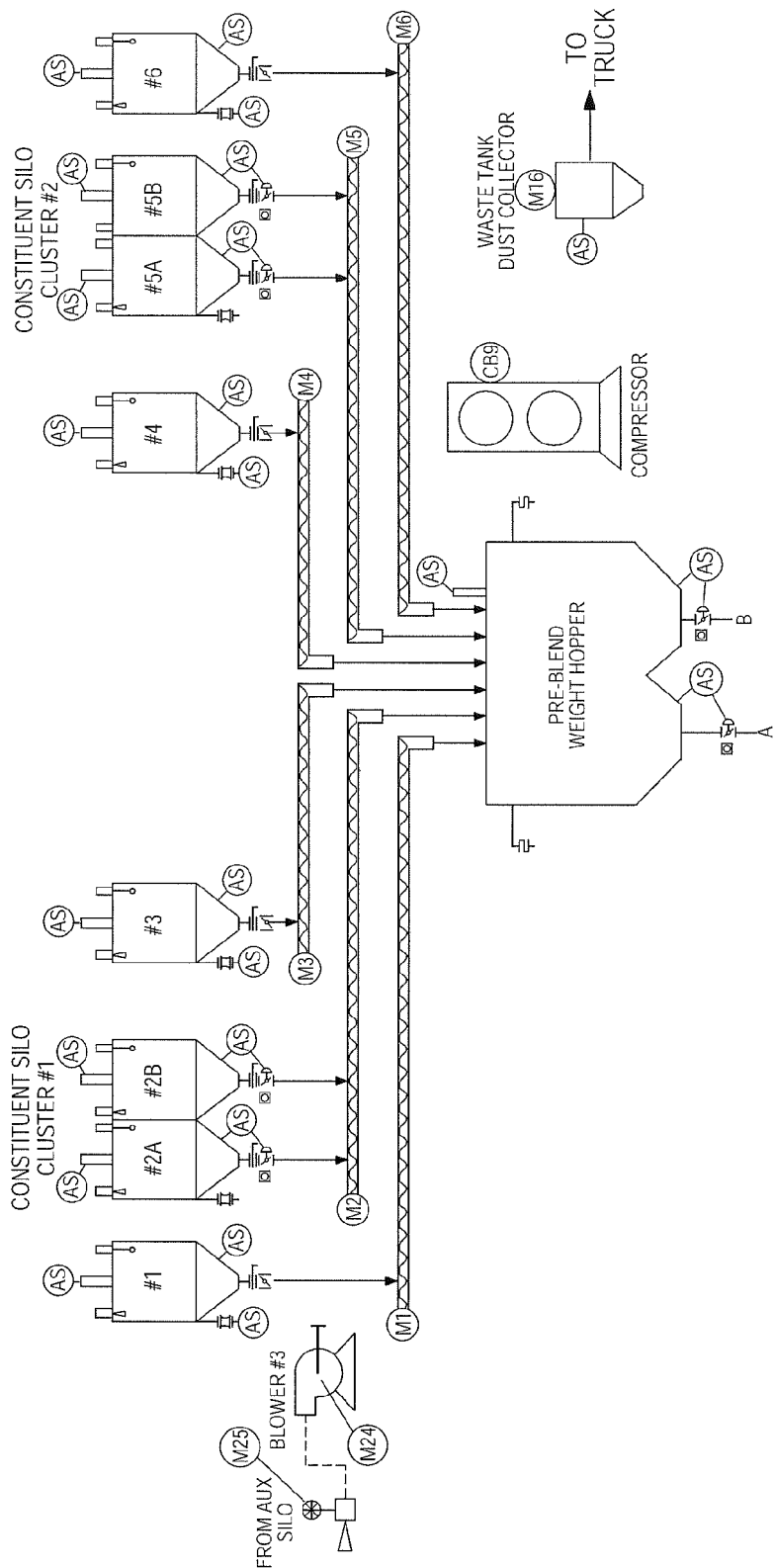
Figure 8B:
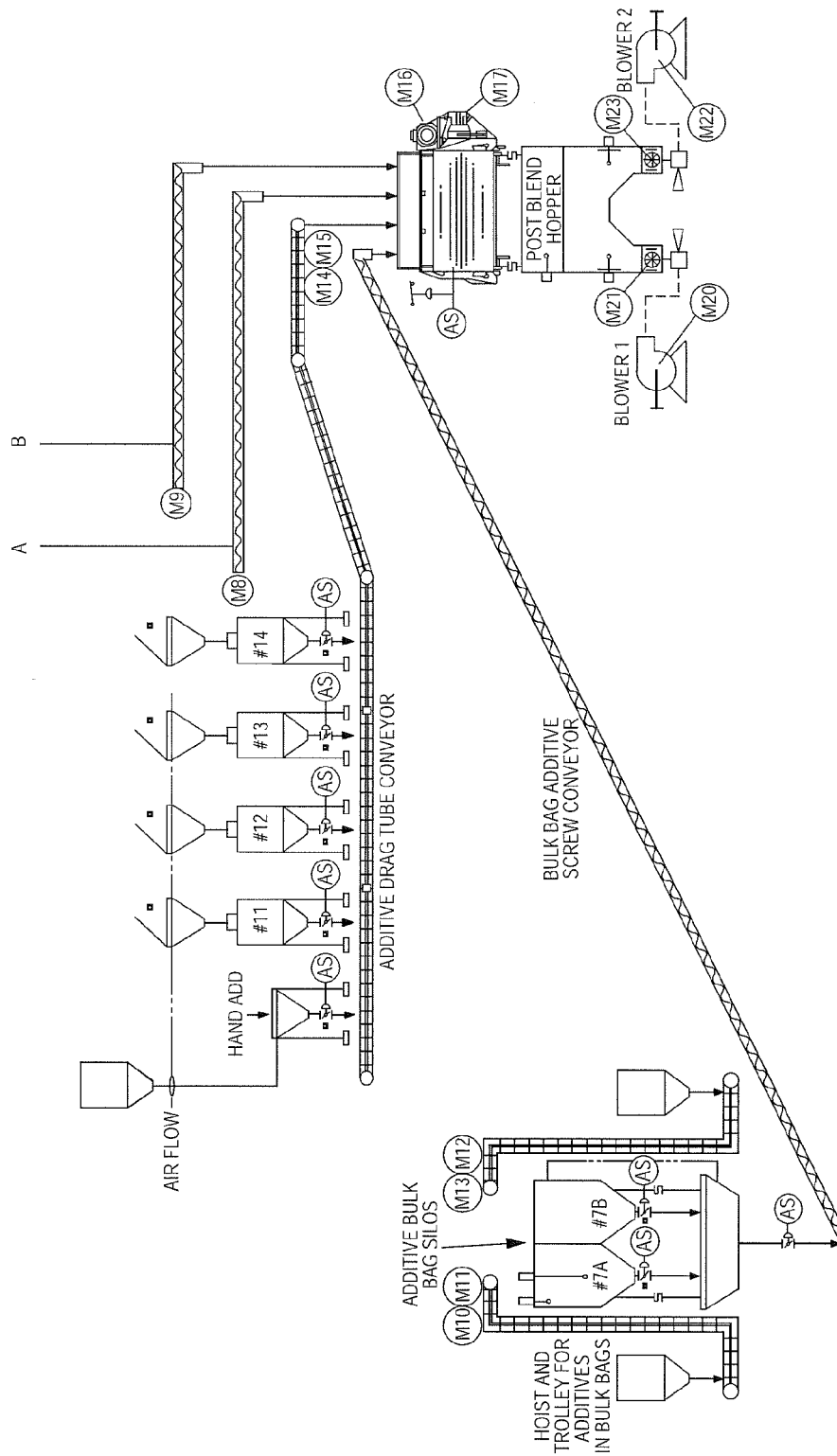

Turning to FIGS. 8a and 8b, the illustrative flow diagram of the atmospheric storage mechanical weigh batch blend plant of FIG. 8 is given along with the legends for each of the items illustrated being listed in FIG. 8c. In this manner, each of the items shown in FIGS. 8a and 8b are controlled as illustrated in FIG. 8a by each of the items as shown in the legend of FIG. 8c. For example, any of the mechanical functions are illustrated by symbols as are contained in the legend of FIG. 8c, such as "load cells", "pneumatic actuator", "slide gate", just to name a few. The illustrative flow diagram as shown in FIGS. 8a and 8b is the type an engineer would use. FIG. 8c is the legend that goes with FIGS. 8a and 8b.

Referring to FIGS. 8d through 8i in combination, the electrical connections to FIGS. 8a and 8b are illustrated. Each of the tanks as illustrated in FIGS. 8a and 8b have the same numerical reference in FIGS. 8d and 8i. A motor control panel 200 is used to operate all of the controls as illustrated in FIGS. 8a and 8b. A description of the item being operated is given in each of the blocks connected to the motor control panel 200. While a part of the motor control panel 200, the utility load center 202 controls specific parts of the weigh batch blend plant.

Figure 8D:
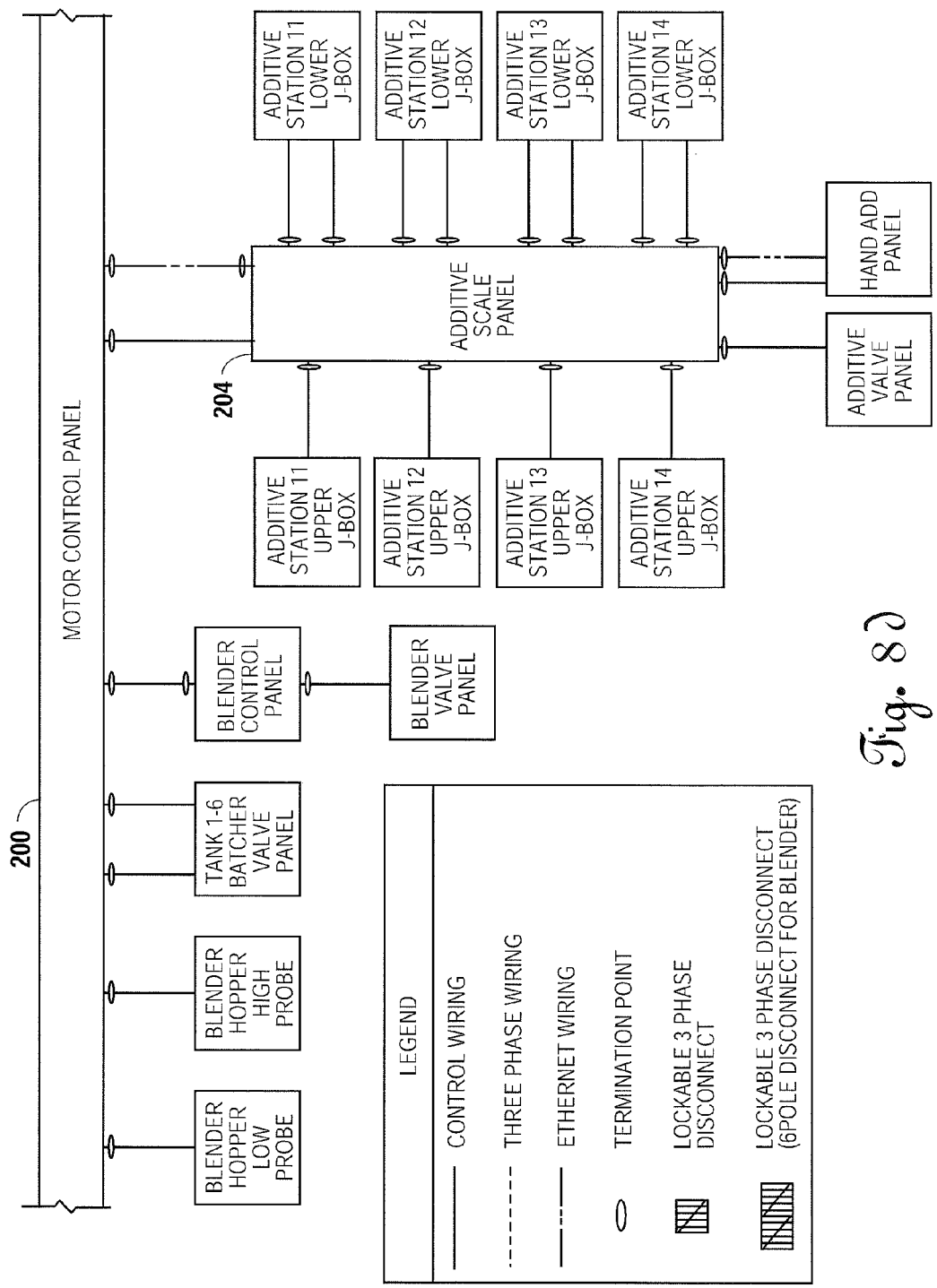
Figure 8E:
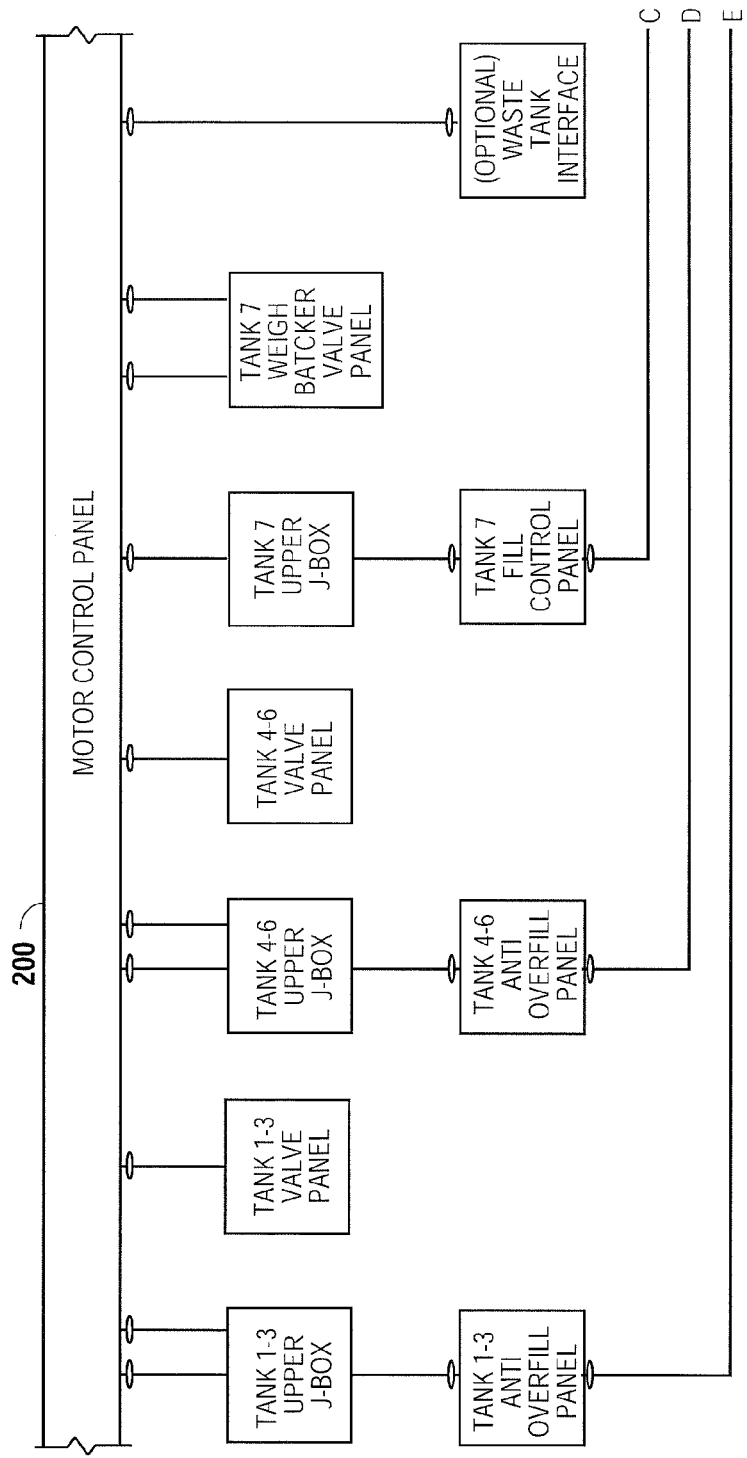

Also connected to the motor control panel 200 is additive scale panel 204, which is used to add the small amounts added to the blend. Use of the term "J-box" as contained in FIGS. 8d and 8i is referring to an electrical junction box.

Figure 8F:
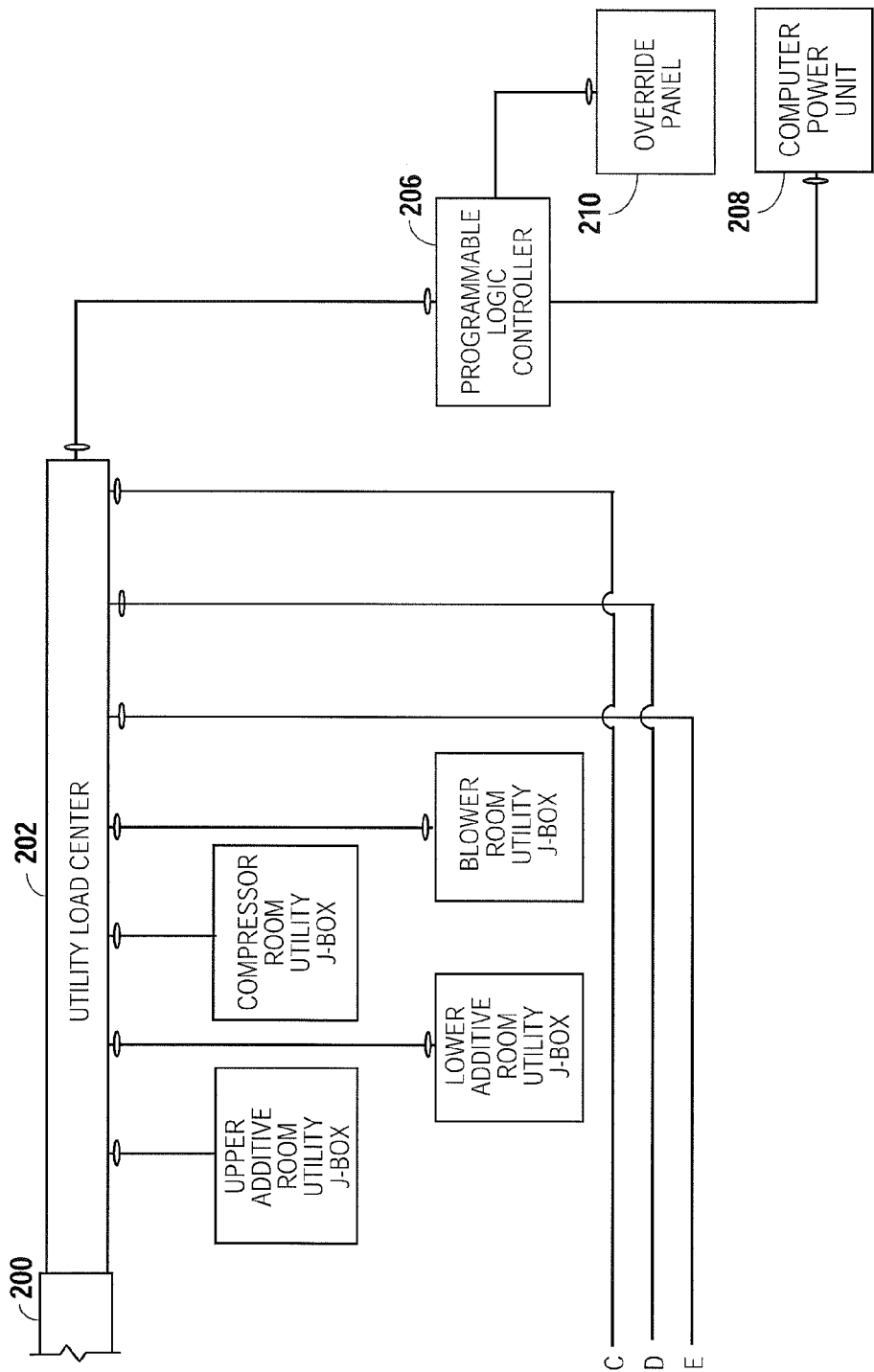
Figure 89:
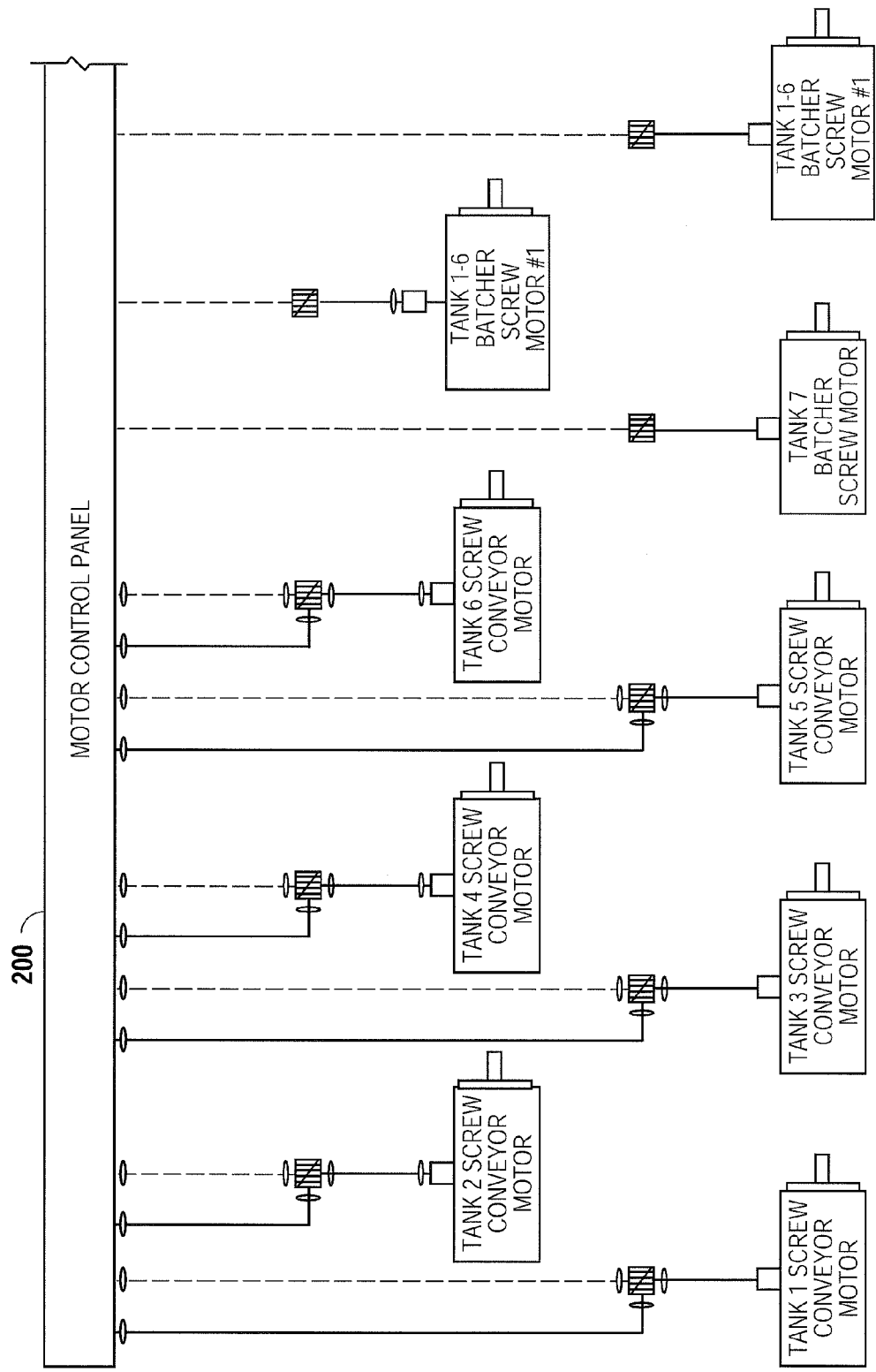
Figure 8H:
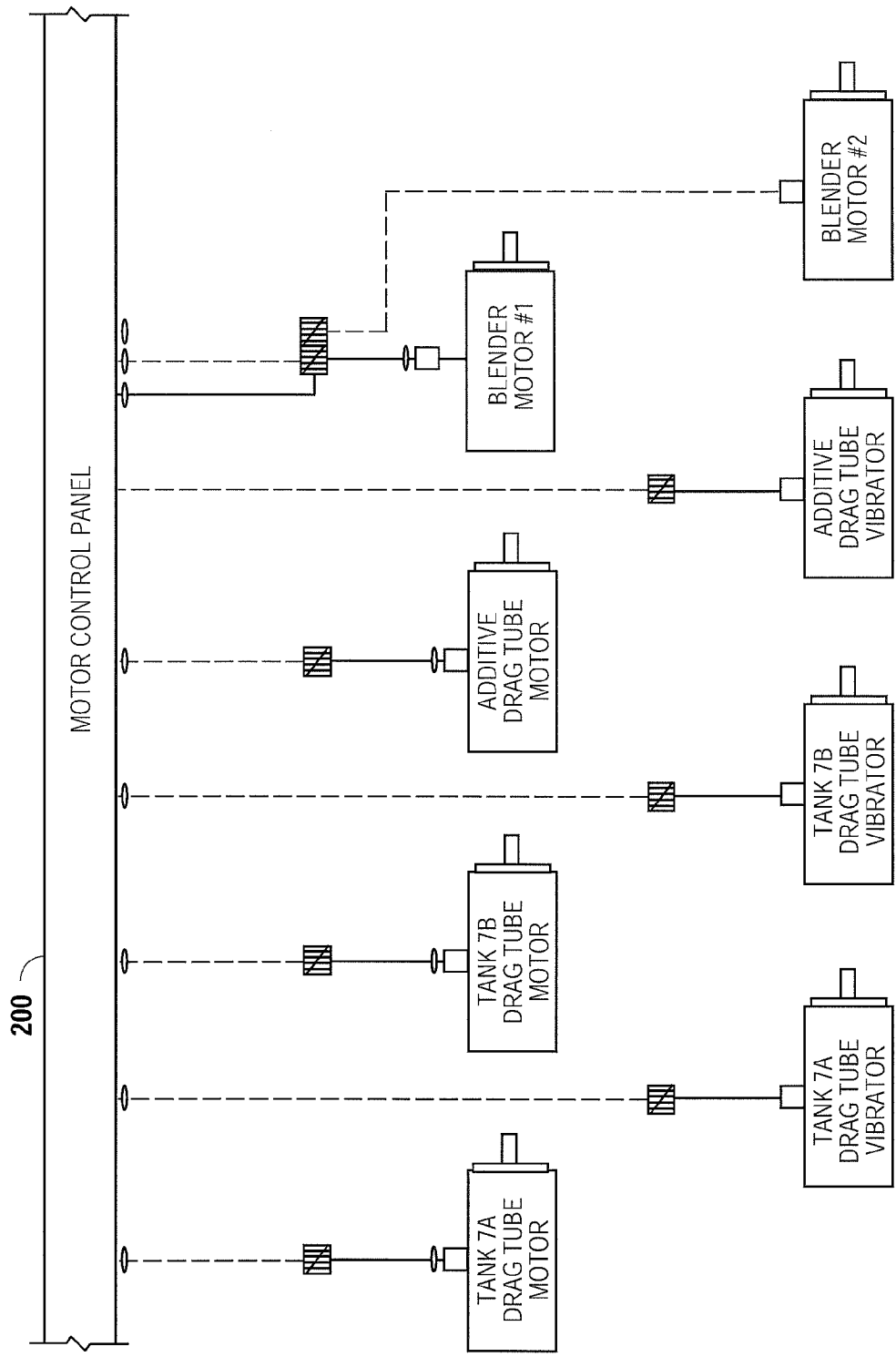
Figure 8I:
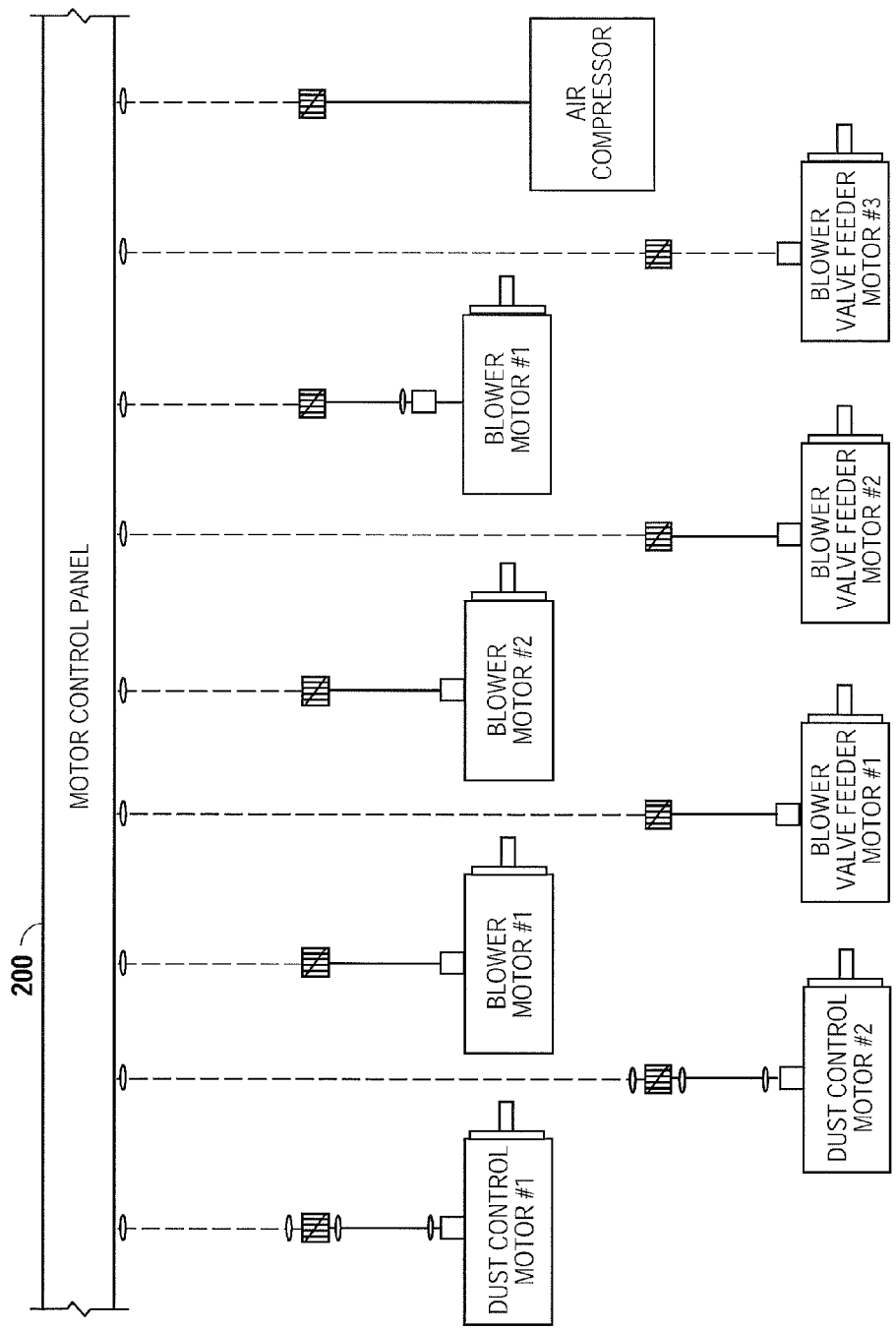

The entire operation is run by a programmable logic controller 206 shown in FIG. 8f, which programmable logic controller 206 sets the recipe being used into the weight batch blending plant. Through the use of the programmable logic controller 206, the recipe can be changed according to the desires of the operator. In one particular oil field, the recipe for the cement may be different than in a different oil field. Therefore, the recipe may have to be changed, depending upon where the end product is being used.

Power for the programmable logic controller 206 is provided by computer power unit 208. It is important that the computer power unit 208 not be subject to power fluctuations and has a backup power source to maintain information in memory.

In case any portion of the program needs to be overwritten, an override panel 210 allows the operator to overrun any portion of the plant as is necessary. Through the use of the override panel 210, if necessary, the entire plant could be run manually.

FIGS. 8a-8i illustrate how a typical atmospheric storage mechanical weigh batch blend plant may be controlled.

Blower 150 may be used to move any of the dry materials when blending the various ingredients.

Figure 9:
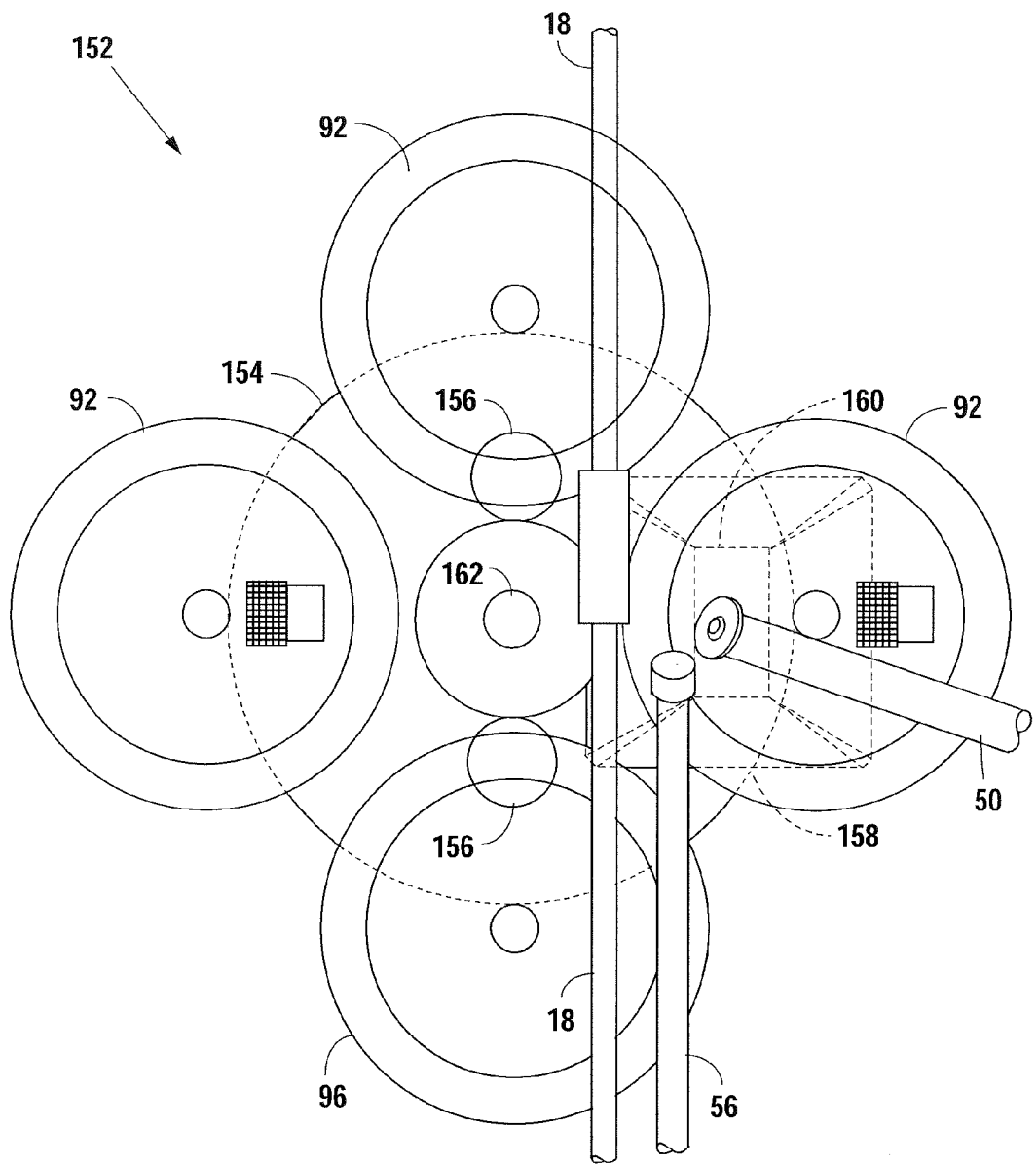
FIG. 9 is a top view of an alternative vertical blender.

While the blender 14 as shown in FIGS. 1, 2 and 3, is a dual shaft horizontal blender, the blender also could be a vertical shaft blender 152 as illustrated in FIG. 9. The vertical shaft blender 152 has a vertical vessel 154 with vertical shafts 156 extending there through. The vertical shafts 156 has paddles (not shown) thereon to blend the material contained within the vertical vessel 154. The dry materials for the ready mix cement is delivered to the vertical vessel 154 via dual screw auger 18 of the large quantities of materials, mechanical screw auger 50 for the intermediate materials, and drag tubes 56 for the small amounts of additives. All of the materials are fed into the vertical hopper 158 or discharged through lower opening 160 into the vertical vessel 154. After the appropriate amounts of the various ingredients are discharged through the vertical hopper 158 into the vertical vessel 154 and thoroughly blended therein, the "pre-blend" cement mix is discharged through discharge opening 162 into one of the pre-blend storage tanks 92.

Typically, a vertical shaft blender 152 will be used for smaller batches, but a horizontal shaft blender such as blender 14 is used for larger batches.

What I claim is:

1. An atmospheric storage batch-type blend plant for providing a dry, pre-blended, cement prepared according to a recipe for use in oil well encasement, said batch blend plant comprising:
    a blender for receiving measured, dry materials to be thoroughly blended into a an accurate pre-blend, the blender having a blender housing, a shaft protruding from the housing, and a bearing assembly attached to the blender housing and surrounding part of the shaft;
    a plurality of bulk storage tanks;
    a bulk weigh batcher for measuring by weight bulk materials from said plurality of bulk storage tanks;
    bulk delivery device for delivering said bulk materials from said bulk weigh batcher to said blender;
    an intermediate weigh vessel for measuring by weight intermediate materials from intermediate storage tanks;
    an intermediate delivery device for delivering said intermediate materials from said intermediate weigh vessel to said blender;
    mini batch weigh vessels for measuring by weight small amounts of additives;
    an additives delivery device for delivering small additives after said measuring to said blender;
    said bulk weigh batcher measuring large quantities by weight, said mini batch weigh vessels measuring small quantities by weight and said intermediate weigh vessel measuring intermediate quantities by weight, all of which are mixed together to give said pre-blend;
    pre-blend containers for receiving said pre-blend after the weighing and blending of said recipe of said bulk materials, said intermediate materials and said small amounts of said additives in said blender; and
    a source of pressurized air being connected to said bearing assembly to provide said pressurized air between bearings in said bearing assembly and said shaft to prevent abrasive materials from getting between said bearings and said shaft.

2. The atmospheric storage batch-type blend plant for providing said dry, pre-blended, cement prepared according to said recipe for use in oil well encasement as recited in claim 1 wherein said bulk delivery device is a bulk screw auger and intermediate delivery device is an intermediate screw auger.

3. The atmospheric storage batch-type blend plant for providing said dry, pre-blended, cement prepared according to said recipe for use in oil well encasement as recited in claim 2 wherein said additives delivery device is drag tubes.

4. The atmospheric storage batch-type blend plant for providing said dry, pre-blended, cement prepared according to said recipe for use in oil well encasement as recited in claim 3 wherein said blender is a dual shaft horizontal blender with paddles being attached to said shafts.

5. The atmospheric storage batch-type blend plant for providing said dry, pre-blended, cement prepared according to said recipe for use in oil well encasement as recited in claim 4 comprising a bag un-loader for unloading bags of said intermediate material into said intermediate storage tanks.

6. The atmospheric storage batch-type blend plant for providing said dry, pre-blended, cement prepared according to said recipe for use in oil well encasement as recited in claim 5 wherein said mini batch weigh vessels includes a hand additive weight station for hand measuring hand weighted additives to be delivered to said blender via said drag tubes.

7. The atmospheric storage batch-type blend plant for providing said dry, pre-blended, cement prepared according to said recipe for use in oil well encasement as recited in claim 3 wherein said blender is a vertical shaft blender.

8. The atmospheric storage batch-type blend plant for providing said dry, pre-blended, cement prepared according to said recipe for use in oil well encasement as recited in claim 6 or 7 wherein containers for such pre-blend are pre-blend storage tanks.

9. The atmospheric storage batch-type blend plant for providing said dry, pre-blended, cement prepared according to said recipe for use in oil well encasement as recited in claim 8 comprising a reclaim storage tank for receiving leftover materials from said pre-blend for subsequent disposal.

10. The blend plant of claim 1 wherein said bearing assembly comprises:
    a cylindrical bearing surface in said bearing surrounding part of the shaft;
    an annulus circumscribing the bearing; and
    a fitting connected to the annulus and having a fitting end connected to said source of pressurized air, wherein the fitting, the annulus and the bearing at least partially define an air duct between the fitting end and the cylindrical bearing surface.

* * * * *